United States Patent [19]

Folberth

[11] E Re. 29,106

[45] Reissued Jan. 11, 1977

[54] DISPLAY RACK FOR LOCKSETS

[76] Inventor: William M. Folberth, 3535 W. 140th St., Cleveland, Ohio 44111

[22] Filed: Nov. 28, 1975

[21] Appl. No.: 635,841

Related U.S. Patent Documents

Reissue of:

[64] Patent No.: 3,774,320
Issued: Nov. 27, 1973
Appl. No.: 299,304
Filed: Oct. 20, 1972

[52] U.S. Cl. ..... 35/49
[51] Int. Cl.[2] ..... G09B 25/00
[58] Field of Search ..... 35/49, 50

[56] References Cited

UNITED STATES PATENTS

| | | | |
|---|---|---|---|
| 2,626,060 | 1/1953 | Rubenstein | 248/DIG. 3 |
| 2,868,386 | 1/1959 | Seyforth | 248/DIG. 3 |

FOREIGN PATENTS OR APPLICATIONS

| | | | |
|---|---|---|---|
| 1,473,045 | 2/1967 | France | 35/49 |

OTHER PUBLICATIONS

Independent Lock Co. Catalogue No. 12, 7, 1941, p. 22 only.

*Primary Examiner*—Harland S. Skogquist
*Attorney, Agent, or Firm*—Richard M. Howell

[57] ABSTRACT

A display and demonstrator rack for [ cylindrical ] locksets of the type used on entryway doors. The rack supports a number of unpackaged, sample locksets in a manner that permits turning of the knobs to operate the knob spindle for retraction of the latchbolt as well as operation of a key or button lock mechanism when provided. The rack also includes means for securing each lockset in place to discourage removal and pilferage.

7 Claims, 3 Drawing Figures

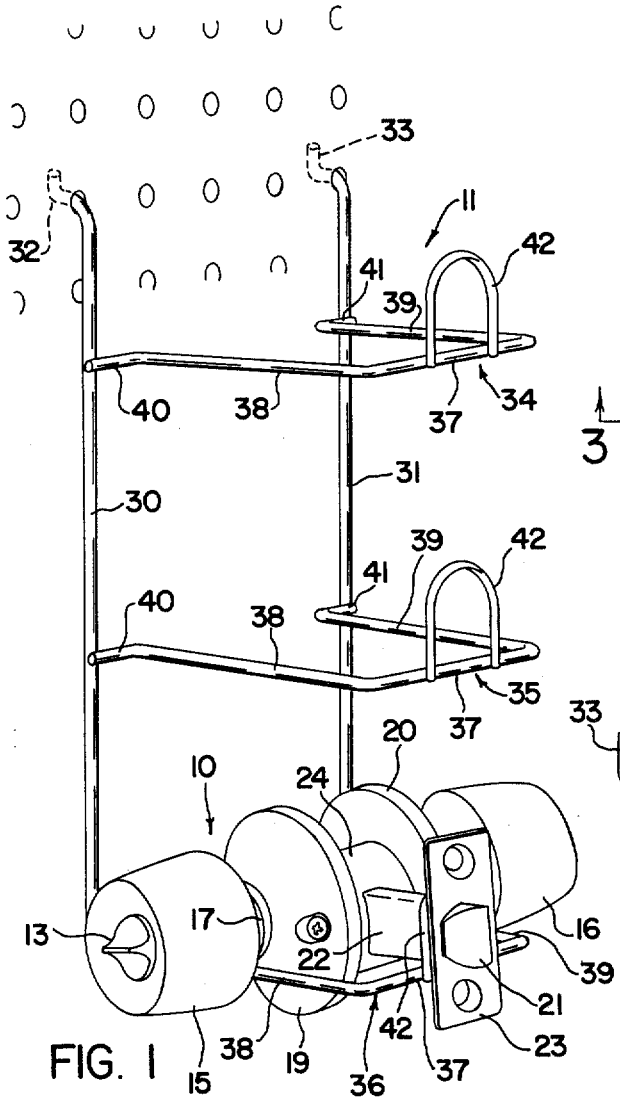
FIG. 1
FIG. 2
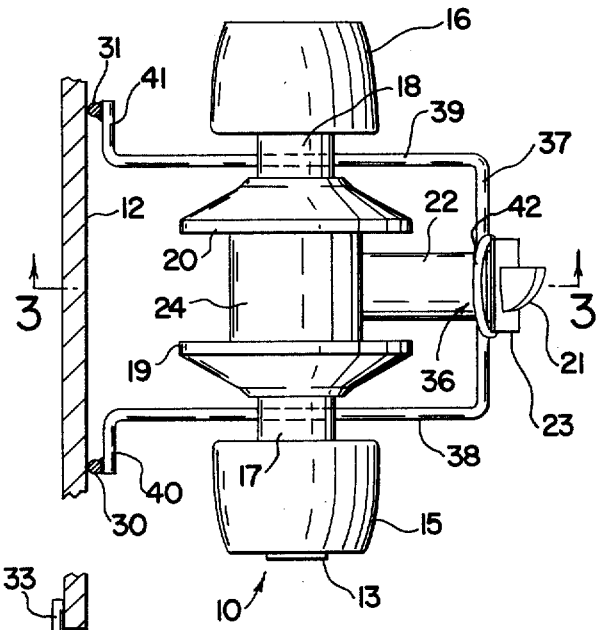
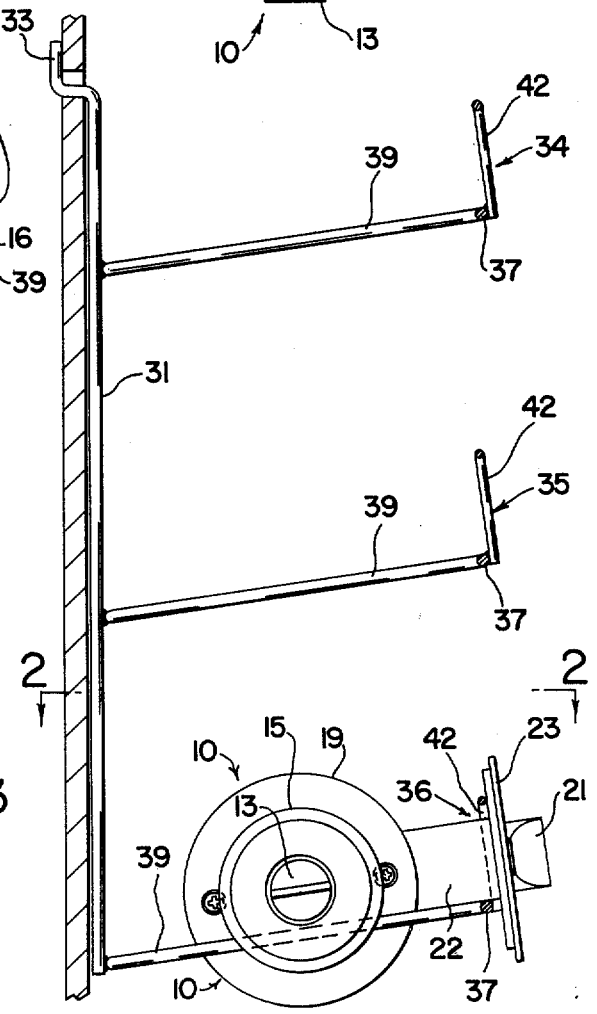
FIG. 3

DISPLAY RACK FOR LOCKSETS

Matter enclosed in heavy brackets [ ] appears in the original patent but forms no part of this reissue specification; matter printed in italics indicates the additions made by reissue.

BACKGROUND OF THE INVENTION

This invention relates to the display and demonstration at the point of sale, of [cylindrical] locksets of the type used in entryway doors, and especially to a rack for displaying a number of unpackaged, sample locksets of different types in a manner that permits operation thereof by customers for the purpose of comparison and demonstration. More particularly, the invention relates to a display rack of the type described to which locksets to be displayed and demonstrated may be secured to prevent removal and damage as well as to prevent pilferage.

[Cylindrical 1] Locksets of the type used with entryway doors in commercial buildings, private homes and the like are sold directly to consumers for replacement and home improvement purposes through retail establishments, such as hardware and department stores. Usually the product line will include three or more different types of locksets for different uses. The more conventional types include key-type locksets for outside entryway doors, [button lock type] locksets for bedroom and bathroom doors and latching-type locksets (no locking mechanism) for closet doors, etc. The sets are usually packaged in boxes or cartons which must be opened in order for the set to be viewed by the customer and demonstrated by a salesman. Thus, current practices as to the display of the product at the point of sale are generally inadequate, inconvenient and timeconsuming for both salesclerks and customers.

Also, once a box or carton containing a lockset has been opened and left in that condition at the point of sale, its contents are vulnerable to pilferage and the mechanisms may be easily damaged by improper operation.

The device of the present invention, however, resolves the difficulties and the long-felt need indicated above, and affords other features and advantages heretofore not obtainable.

SUMMARY OF THE INVENTION

It is among the objects of the invention to more adequately display and demonstrate unpackaged [cylindrical] locksets at the point of sale in retail stores.

Another object is to display several different types of cylindrical locksets in the same product line in a manner to permit operation by a customer for demonstration purposes.

Still another object is to inhibit pilferage or breakage of locksets displayed for sale in retail stores.

These and other objects and advantages are accomplished in accordance with the present invention by means of a display and demonstrator rack adapted to be hung on a wall or a vertical panel such as a "pegboard" panel and to support in operable condition a plurality of sample [cylindrical] locksets. The rack includes an upright frame structure with provision for securing it to the wall or panel and a plurality of supporting brackets vertically spaced from one another and extending outwardly from the frame structure. Each bracket is adapted to support a sample lockset. At the outer end of each bracket is a retainer loop fastened to the bracket and defining an opening of sufficient size to receive a latchbolt housing that is passed through from the outside and connected to its respective knob and spindle assembly so that the retainer loop is located between the latchbolt housing plate and the knob and spindle assembly. The opening is of a size sufficiently small that the latchbolt housing plate cannot be passed through it and thus the lockset cannot be removed from the rack unless it is disassembled. Also when a lockset is so supported by its respective bracket and retainer loop, the knobs may be turned to operate the latchbolt and the locking mechanism may be actuated in order that the functioning of the lockset can be demonstrated to a prospective purchaser.

BRIEF DESCRIPTION OF THE DRAWINGS

FIG. 1 is a perspective view illustrating a display and demonstrator rack embodying the invention and showing a lockset supported and retained by the lowermost bracket of the rack;

FIG. 2 is a sectional view taken on the line 2—2 of FIG. 3; and

FIG. 3 is a sectional view taken on the line 3—3 of FIG. 2.

DESCRIPTION OF THE PREFERRED EMBODIMENT

Referring more particularly to the drawings, there is shown a lockset 10 (the lockset by itself being of standard design and construction and forming no part of the invention) supported on a display and demonstrator rack 11 embodying the invention. The rack 11 is shown for the purpose of illustration, hung on a wall panel 12 with symmetrically spaced perforations and known generally in the trade as "pegboard". While for the purpose of illustration, only one lockset 10 is shown on the rack 11, the rack is adapted to support for display and demonstration three sample [cylindrical] locksets which usually would be of different types in one particular product line. The lockset 10 is of the type adapted for use in bedroom and bathroom entryway doors and it uses a locking button 13 so that the door may be locked and unlocked normally from the inside only.

The lockset 10 also includes an inside knob 15 that contains the locking button 13, an outside knob 16 (not provided with a locking mechanism), inside and outside sleeves 17 and 18 respectively, an inside rose 19, an outside rose 20 and a conventional latchbolt assembly. The latchbolt assembly includes a latchbolt 21, a latchbolt housing 22 and a latchbolt plate 23 secured to the latchbolt housing 22 and adapted to be anchored to the end face of the entryway door to which the lockset is to be attached.

A spindle and retractor mechanism (not shown) as well as the internal portions of the latchbolt 21 are located within a [cylindrical] case 24 adapted to be fitted in a bore extending through an entryway door in a manner well known and understood by those skilled in the art.

The rack 11 is formed by bent lengths of round steel rod welded together and includes a pair of spaced parallel vertical hanger rods 30 and 31 having anchor lugs 32 and 33 respectively at their upper ends for use in attaching the rack 11 to the pegboard panel 12. The lugs extend through holes in the panel 12 in the conventional manner and the rods 30 and 31 are spaced apart a predetermined standard spacing so that the lugs 32 and 33 register with two holes at the same level in standard pegboard. Welded to the hanger rods 30 and 31 are three spaced U-shaped brackets 34, 35 and 36, each of which is adapted to receive and support a [cylindrical] lockset such as the lockset 10 illustrated herein.

Each of the brackets 34, 35 and 36 includes an outer horizontal cross span 37 that is generally parallel to the wall panel 12 and that joins a pair of parallel bracket arms 38 and 39 extending outwardly from the hanger rods 30 and 31 respectively and having a slight downward slope toward the wall 12. Each arm 38, 39 has a lug 40, 41 at its inner end that is welded to the respective hanger rod. The arms 38 and 39 are spaced from one another such that when the lockset 10 is supported thereon, the point of engagement between each arm and the lockset 10 occurs at the sleeves 17 and 18 between the respective knobs 15 and 16 and roses 19 and 20. Thus, when the lockset 10 is so supported, both knobs 15 and 16 are free to be turned to retract the latchbolt 21 for the purpose of demonstration.

Welded to the cross span 37 of each of the brackets 34, 35 and 36 is an upright retainer loop 42, defining with the respective cross span 37 an opening of sufficient size to receive therethrough the latchbolt housing 22 of the lockset 10. The opening, however, is of a size sufficiently small that the latchbolt housing plate 23 cannot be passed through it. Thus, in order to locate the lockset 10 in its position for display and demonstration on the respective bracket of the rack 11, the lockset 10 must be disassembled to the extent that the latchbolt and housing assembly is removed from the spindle and knob assembly.

When disassembled, the latchbolt housing 22 is passed through the respective retainer loop 42 from the outside and then reconnected to the spindle and knob assembly resting on the arms 38 and 39 of the bracket. Thus, with the lockset assembled and so supported by the rack 11, the knobs may be turned to retract the latchbolt 21 and the locking button 13 may be operated as desired to lock or unlock the spindle for retracting the latchbolt 21.

It will be readily apparent that the lockset 10 thus assembled and supported on the rack 11 may not be removed from the rack unless it is disassembled. Normally, two other sample locksets will be loaded on the rack 11 with the [button type] lockset 10 shown and described herein. Boxes containing the various types of locksets displayed are usually stacked at a location close to the display and demonstrator rack 11 to be sold to purchasers.

While the invention has been shown and described with reference to a specific embodiment thereof, this is intended for the purpose of illustration rather than limitation and other modifications and variations of the specific display rack herein shown and described will be readily apparent to those skilled in the art all within the intended spirit and scope of the invention. Accordingly, the patent is not to be limited in scope and effect to the specific embodiment herein shown and described nor in any other way that is inconsistent with the extent to which the progress in the art has been advanced by the invention.

I claim:

1. In combination, a [cylindrical] lockset comprising a latch bolt assembly including a housing with an integral plate, and a knob and spindle assembly interconnectable with said latch bolt assembly; and a display and demonstrator rack comprising an upright frame, a plurality of vertically spaced supporting brackets extending outwardly from said frame and adapted to support in operable condition, said knob and spindle assembly, and a plurality of lockset retaining means, one being anchored to the outer portion of each of said brackets, each retaining means defining with its respective bracket an opening adapted to receive therethrough, said latch bolt housing and to retain said latch bolt plate on the outer side thereof, whereby said lockset is supported in operable condition for the purpose of demonstration, and secured against casual removal, on said rack.

2. A combination as defined in claim 1 wherein said rack includes three of said brackets.

3. A combination as defined in claim 1 including means integral with said upright frame for hanging said rack on a vertical pegboard panel.

4. A combination as defined in claim 1 wherein said rack is formed of lengths of round steel rod bent to shape and welded together.

5. A combination as defined in claim 4 wherein said brackets are of a generally U-shaped configuration.

6. A combination as defined in claim 1 wherein said retaining means comprises an upright loop of metal rod having its legs secured to the outer end of said bracket.

7. A combination as defined in claim 1 wherein said brackets are in planes parallel to one another and having a downward slope toward said upright frame.

* * * * *